United States Patent
Yang et al.

(10) Patent No.: US 11,582,739 B2
(45) Date of Patent: Feb. 14, 2023

(54) DETERMINING TIME DOMAIN RESOURCES FOR UPLINK CANCELLATION

(71) Applicant: QUALCOMM Incorporated, San Diego, CA (US)

(72) Inventors: Wei Yang, San Diego, CA (US); Seyedkianoush Hosseini, San Diego, CA (US); Peter Gaal, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 17/181,188

(22) Filed: Feb. 22, 2021

(65) Prior Publication Data

US 2021/0274475 A1    Sep. 2, 2021

Related U.S. Application Data

(60) Provisional application No. 62/982,424, filed on Feb. 27, 2020.

(51) Int. Cl.
 *H04W 72/04* (2009.01)
 *H04L 5/00* (2006.01)
 *H04W 72/0446* (2023.01)

(52) U.S. Cl.
 CPC ......... *H04W 72/042* (2013.01); *H04L 5/0048* (2013.01); *H04W 72/0446* (2013.01)

(58) Field of Classification Search
 CPC ........... H04W 72/042; H04W 72/0446; H04W 72/1289; H04L 5/0048; H04L 5/001; H04L 5/0094
 See application file for complete search history.

(56) References Cited

U.S. PATENT DOCUMENTS

| | | | |
|---|---|---|---|
| 2021/0014866 A1* | 1/2021 | Shi | H04W 80/08 |
| 2021/0022134 A1* | 1/2021 | Chen | H04L 5/0094 |
| 2021/0144688 A1* | 5/2021 | Lin | H04L 1/1812 |
| 2021/0250074 A1* | 8/2021 | Hosseini | H04B 7/0626 |
| 2022/0217750 A1* | 7/2022 | Liu | H04W 72/1242 |

FOREIGN PATENT DOCUMENTS

| | | | | |
|---|---|---|---|---|
| CN | 110149716 A | * | 8/2019 | |
| EP | 3780809 A1 | | 2/2021 | |
| EP | 3890425 A1 | * | 10/2021 | H04L 5/0053 |
| WO | WO-2019184688 A1 | | 10/2019 | |
| WO | WO-2019191977 A1 | | 10/2019 | |
| WO | WO-2021056528 A1 | * | 4/2021 | H04L 5/00 |

OTHER PUBLICATIONS

International Search Report and Written Opinion—PCT/US2021/019196—ISA/EPO—dated Jun. 21, 2021.

* cited by examiner

*Primary Examiner* — Mounir Moutaouakil
(74) *Attorney, Agent, or Firm* — Harrity & Harrity, LLP

(57) ABSTRACT

Various aspects of the present disclosure generally relate to wireless communication. In some aspects, a user equipment (UE) may determine an offset value to be used to determine reference uplink resources associated with uplink cancellation indications; receive an uplink cancellation indication; and cancel an uplink communication in a set of reference uplink resources, wherein the set of reference uplink resources are determined based at least in part on the offset value and a time domain resource in which the uplink cancellation indication is received. Numerous other aspects are provided.

30 Claims, 8 Drawing Sheets

DETERMINING TIME DOMAIN RESOURCES FOR UPLINK CANCELLATION

CROSS-REFERENCE TO RELATED APPLICATION

This Patent Application claims priority to U.S. Provisional Patent Application No. 62/982,424, filed on Feb. 27, 2020, entitled "DETERMINING TIME DOMAIN RESOURCES FOR UPLINK CANCELLATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for determining time domain resources for uplink cancellation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining an offset value to be used to determine reference uplink resources associated with uplink cancellation indications; receiving an uplink cancellation indication; and cancelling an uplink communication in a set of reference uplink resources, wherein the set of reference uplink resources are determined based at least in part on the offset value and a time domain resource in which the uplink cancellation indication is received.

In some aspects, a method of wireless communication, performed by a base station, may include transmitting, to a UE, a configuration message that indicates an offset value to be used to indicate reference uplink resources associated with uplink cancellation indications; identifying one or more time domain resources in which an uplink communication of the UE is to be cancelled; and transmitting, to the UE, an uplink cancellation indication that indicates a set of reference uplink resources that includes the one or more time domain resources in which the uplink communication is to be cancelled, wherein the set of reference uplink resources is indicated based at least in part on the offset value and a time domain resource in which the uplink cancellation indication is transmitted.

In some aspects, a UE for wireless communication may include a memory and one or more processors operatively coupled to the memory. The memory and the one or more processors may be configured to determine an offset value to be used to determine reference uplink resources associated with uplink cancellation indications; receive an uplink cancellation indication; and cancel an uplink communication in a set of reference uplink resources, wherein the set of reference uplink resources are determined based at least in part on the offset value and a time domain resource in which the uplink cancellation indication is received.

In some aspects, a base station for wireless communication may include a memory and one or more processors operatively coupled to the memory. The memory and the one or more processors may be configured to transmit, to a UE, a configuration message that indicates an offset value to be used to indicate reference uplink resources associated with uplink cancellation indications; identify one or more time domain resources in which an uplink communication of the UE is to be cancelled; and transmit, to the UE, an uplink cancellation indication that indicates a set of reference uplink resources that includes the one or more time domain resources in which the uplink communication is to be cancelled, wherein the set of reference uplink resources is indicated based at least in part on the offset value and a time domain resource in which the uplink cancellation indication is transmitted.

In some aspects, a non-transitory computer-readable medium may store one or more instructions for wireless communication. The one or more instructions, when executed by one or more processors of a UE, may cause the one or more processors to determine an offset value to be used to determine reference uplink resources associated with uplink cancellation indications; receive an uplink cancellation indication; and cancel an uplink communication in a set of reference uplink resources, wherein the set of reference uplink resources are determined based at least in part on the offset value and a time domain resource in which the uplink cancellation indication is received.

In some aspects, a non-transitory computer-readable medium may store one or more instructions for wireless communication. The one or more instructions, when executed by one or more processors of a base station, may cause the one or more processors to transmit, to a UE, a configuration message that indicates an offset value to be used to indicate reference uplink resources associated with uplink cancellation indications; identify one or more time domain resources in which an uplink communication of the UE is to be cancelled; and transmit, to the UE, an uplink cancellation indication that indicates a set of reference uplink resources that includes the one or more time domain resources in which the uplink communication is to be cancelled, wherein the set of reference uplink resources is indicated based at least in part on the offset value and a time domain resource in which the uplink cancellation indication is transmitted.

In some aspects, an apparatus for wireless communication may include means for determining an offset value to be used to determine reference uplink resources associated with uplink cancellation indications; means for receiving an uplink cancellation indication; and means for cancelling an uplink communication in a set of reference uplink resources, wherein the set of reference uplink resources are determined based at least in part on the offset value and a time domain resource in which the uplink cancellation indication is received.

In some aspects, an apparatus for wireless communication may include means for transmitting, to a UE, a configuration message that indicates an offset value to be used to indicate reference uplink resources associated with uplink cancellation indications; means for identifying one or more time domain resources in which an uplink communication of the UE is to be cancelled; and means for transmitting, to the UE, an uplink cancellation indication that indicates a set of reference uplink resources that includes the one or more time domain resources in which the uplink communication is to be cancelled, wherein the set of reference uplink resources is indicated based at least in part on the offset value and a time domain resource in which the uplink cancellation indication is transmitted.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the Figs. is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

Figure 1:
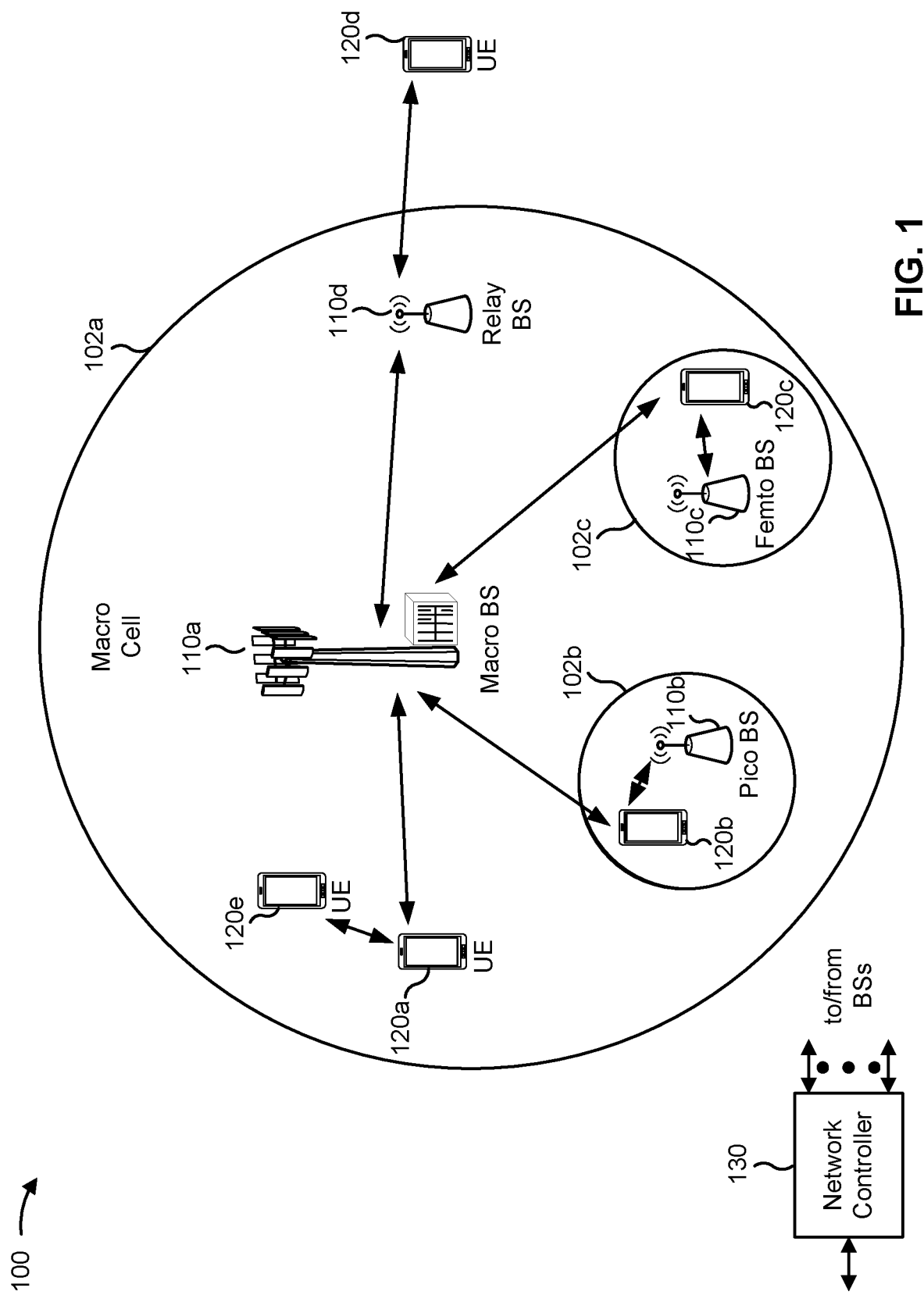
FIG. 1 is a diagram illustrating an example of a wireless communication network, in accordance with the present disclosure.

FIG. 1 is a diagram illustrating a wireless network 100 in which aspects of the present disclosure may be practiced. The wireless network 100 may be an LTE network or some other wireless network, such as a 5G or New Radio (NR) network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
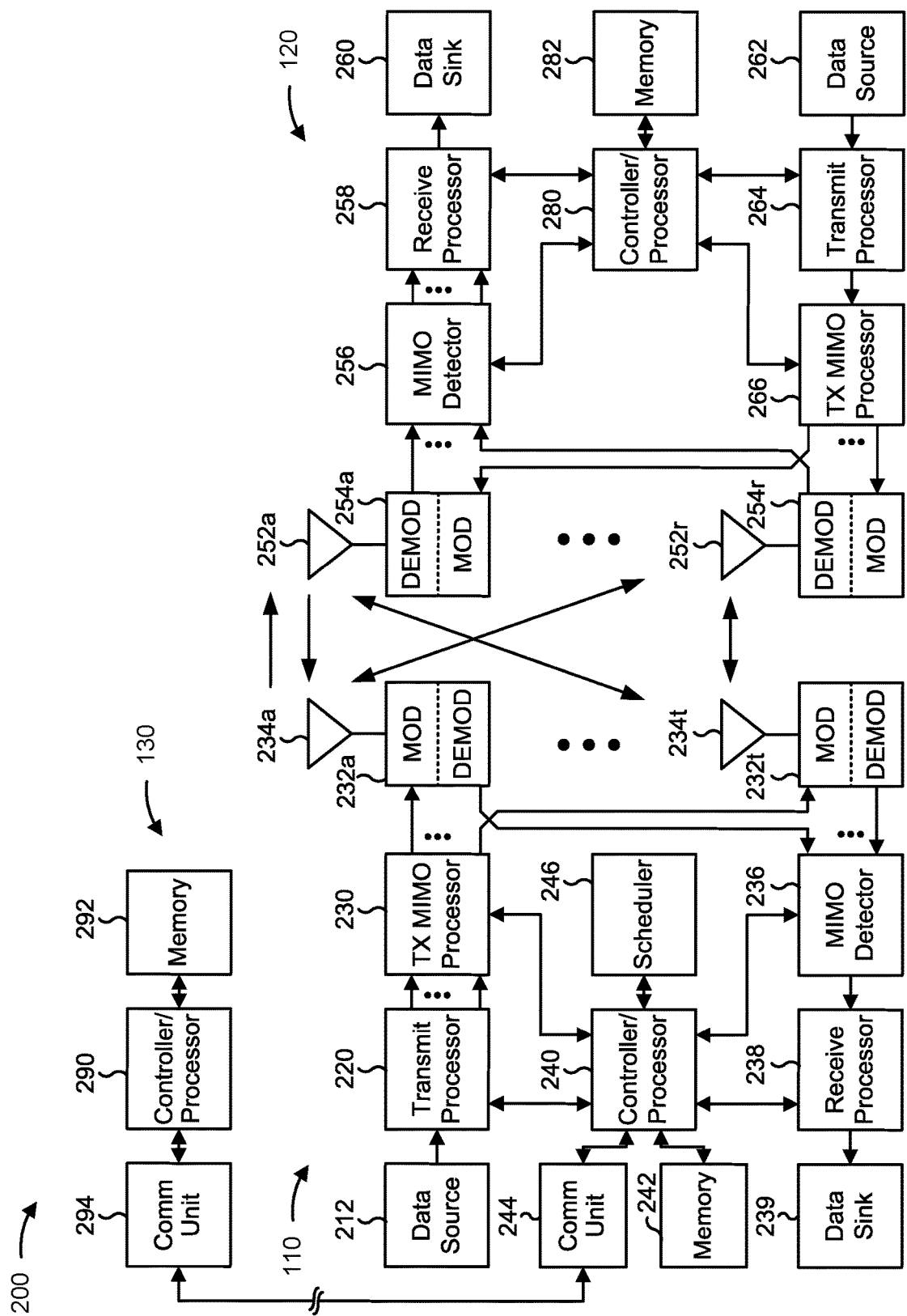
FIG. 2 is a diagram illustrating an example of a base station in communication with a UE in a wireless communication network, in accordance with the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with determining time domain resources for uplink cancellation, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 500 of FIG. 5, process 600 of FIG. 6, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for determining an offset value to be used to determine reference uplink resources associated with uplink cancellation indications; means for receiving an uplink cancellation indication; means for cancelling an uplink communication in a set of reference uplink resources, wherein the set of reference uplink resources are determined based at least in part on the offset value and a time domain resource in which the uplink cancellation indication is received; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, a configuration message that indicates an offset value to be used to indicate reference uplink resources associated with uplink cancellation indications; means for identifying one or more time domain resources in which an uplink communication of the UE is to be cancelled; means for transmitting, to the UE, an uplink cancellation indication that indicates a set of reference uplink resources that includes the one or more time domain resources in which the uplink communication is to be cancelled, wherein the set of reference uplink resources is indicated based at least in part on the offset value and a time domain resource in which the uplink cancellation indication is transmitted; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
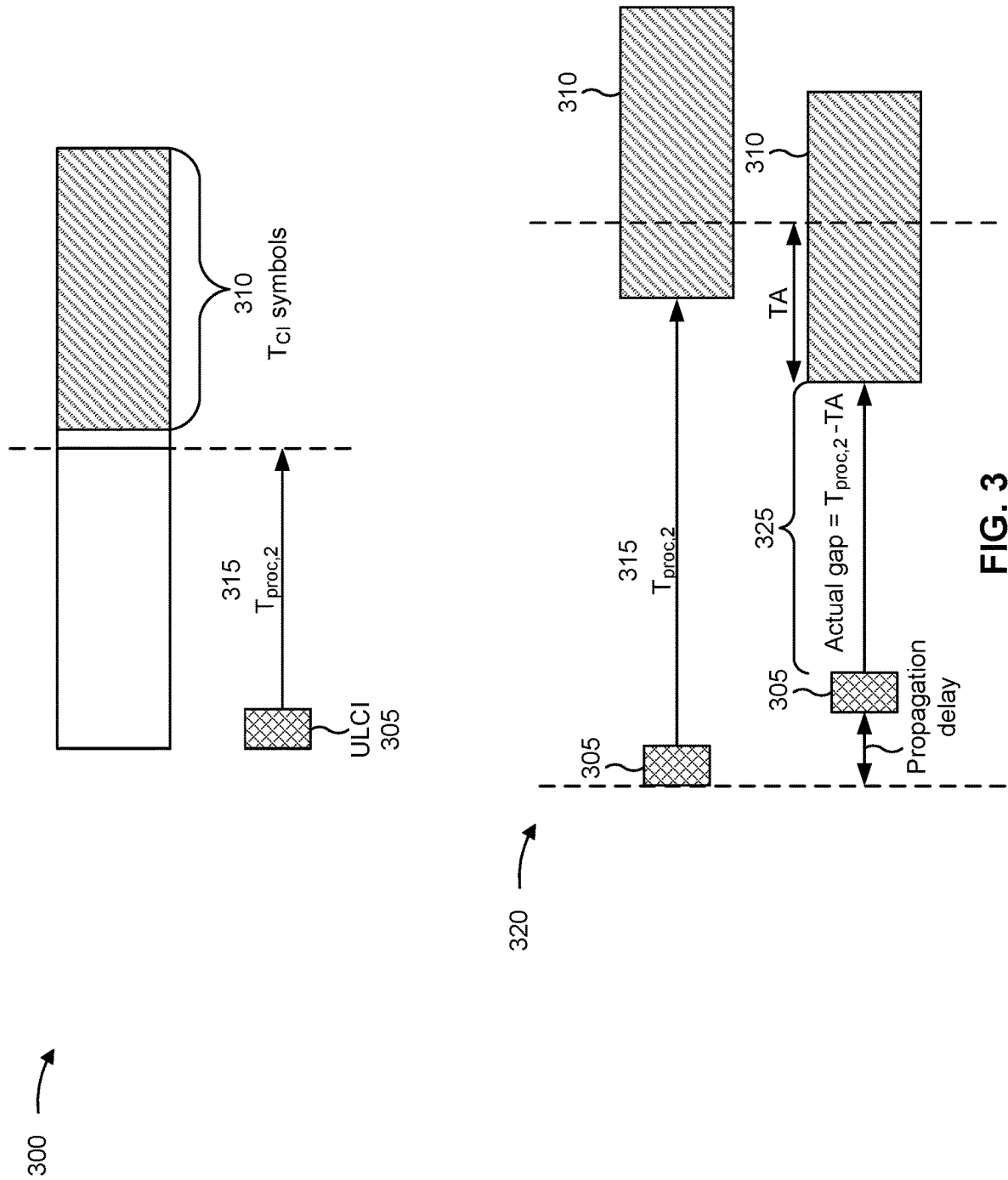
FIG. 3 is a diagram illustrating an example of determining time domain resources for uplink cancellation without accounting for timing advance, in accordance with the present disclosure.

FIG. 3 is a diagram illustrating an example 300 of determining time domain resources for uplink cancellation without accounting for timing advance, in accordance with the present disclosure.

An uplink cancellation indication (ULCI) 305, sometimes referred to as an uplink pre-emption indication (ULPI), may be used to cancel or pre-empt one or more uplink communications of a UE. For example, a base station may schedule a low priority uplink communication (e.g., an enhanced mobile broadband (eMBB) communication) for a UE, and may later need to schedule a high priority communication (e.g., an ultra-reliable low-latency communication (URLLC)) for that UE or for another UE. In this case, the base station may cancel the low priority uplink communication scheduled for a UE (or a group of low priority uplink communications scheduled for a group of UEs) by transmitting a ULCI 305 to the UE (or to the group of UEs). Alternatively, the base station may cancel a portion of the low priority uplink communication (e.g., a portion that overlaps or collides with the high priority communication).

A UE may receive the ULCI 305 prior to the scheduled low priority communication, and may cancel all or a portion of the scheduled low priority communication to prevent interference with the high priority communication. Thus, the ULCI 305 enables the base station to schedule high priority communications on resources that were previously allocated to low priority communications, and to avoid interference to the high priority communications caused by the low priority communications.

In some cases, the base station may transmit the ULCI 305 using downlink control information (DCI) (e.g., a physical downlink control channel (PDCCH) communication) having a particular format, such as DCI format 2_4. The ULCI 305 may be used to cancel one or more uplink communications previously scheduled for a UE (e.g., on a serving cell via which the ULCI is received), such as a physical uplink shared channel (PUSCH) communication (e.g., an uplink data communication), a sounding reference signal (or another type of uplink reference signal), and/or the like. The ULCI 305 may indicate (e.g., explicitly or implicitly) a set of reference uplink resources 310 in which uplink communications are to be cancelled (shown as Ta symbols). The set of reference uplink resources 310 may include one or more time domain resources. In some cases, the set of reference uplink resources 310 are referred to as time domain resources associated with a cancellation indication, and may include a number of symbols (e.g., orthogonal frequency division multiplexing (OFDM) symbols) represented as $T_{CI}$.

A UE may receive the ULCI 305, and may determine the set of reference uplink resources 310 based at least in part on a time domain resource in which the ULCI 305 is received and an uplink processing time 315 of the UE. For example, the initial symbol (e.g., the first symbol or earliest symbol in time) of the set of reference uplink resources 310 may be a first symbol that occurs $T_{proc,2}$ symbols after a last symbol of the ULCI 305 (e.g., from an end of PDCCH reception of DCI having format 2_4). Here, $T_{proc,2}$ represents an uplink processing time 315 of the UE (e.g., a PUSCH preparation procedure time), such as a time required for the UE to detect the ULCI 305 and to cancel a corresponding uplink communication (e.g., an uplink communication included in the set of reference uplink resources 310). As a more specific example, $T_{proc,2}$ may represent a PUSCH processing preparation time corresponding to PUSCH processing capability 2 of the UE. In some aspects, the UE may indicate the uplink processing time 315 (e.g., corresponding to PUSCH processing capability 2) to the base station in a UE capability report.

However, due to propagation delay of communications between a base station and a UE, there may be timing differences between downlink communications and uplink communications. For example, an internal timing (e.g., symbol locations, symbol boundaries, slot locations, slot boundaries, and/or the like) maintained by a UE may not be synchronized with an internal timing maintained by a base station. Timing differences may depend on a location of the UE in a cell (e.g., in relation to the base station), which results in different propagation delays. To compensate for propagation delays and lack of synchronization, a UE may adjust or advance a transmit time used by the UE to transmit uplink communications. For example, the base station may transmit a timing advance (TA) command to the UE, and the UE may adjust (e.g., advance) a transmit time for uplink communications according to the TA command (e.g., according to a TA value indicated in the TA command). This enables the base station to receive uplink communications from the UE in accordance with the internal timing maintained by the base station.

As shown by reference number 320, when the UE adjusts a transmit time for an uplink communication (e.g., included in the set of reference uplink communications 310) according to a TA command, the uplink communication may occur earlier in time than if the UE were to use an internal timing previously stored by the UE prior to receiving the TA command. As a result, a time gap between reception of the ULCI 305 by the UE and scheduled transmission of the uplink communication may be reduced, as shown by reference number 325. This may result in the time gap being less than a UE uplink processing time for detecting the ULCI 305 and cancelling an uplink communication (e.g., may be less than the value of $T_{proc,2}$). As a result, the UE may not be capable of cancelling the uplink communication (e.g., on one or more symbols in a beginning portion of the set of reference uplink resources 310), and may transmit the uplink communication. This may cause interference with a higher priority uplink communication (e.g., a URLLC communication), thereby reducing reliability and increasing latency of URLLC communications.

Some techniques and apparatuses described herein enable a UE and a base station to account for a TA value when cancelling uplink communications. For example, the base station may configure an offset value (e.g., d) that may be added to the value of $T_{proc,2}$ for the UE to determine an initial symbol for the set of reference uplink resources 310. As a result, a UE may be capable of cancelling an uplink communication, that is advanced in time, because a start of the set of reference uplink resources 310 is shifted later in time by the offset value, which may be a number of symbols that is greater than the impact of the TA value. In this way, interference with a high priority uplink communications (e.g., a URLLC communication) may be avoided, thereby increasing reliability and reducing latency of URLLC communications.

As indicated above, FIG. 3 is provided as an example. Other examples may differ from what is described with regard to FIG. 3.

Figure 4:
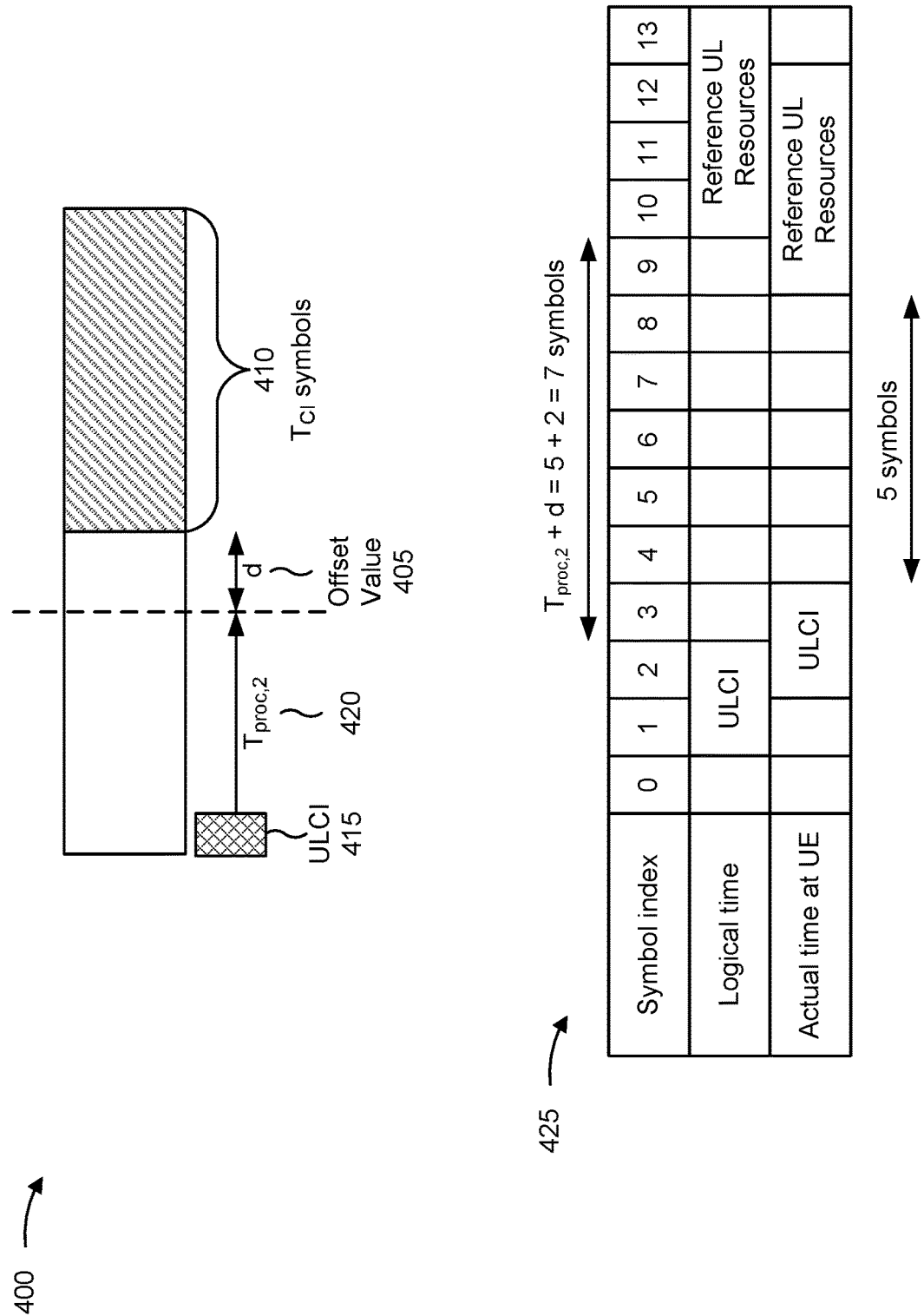
FIG. 4 is a diagram illustrating an example of determining time domain resources for uplink cancellation taking into account timing advance, in accordance with the present disclosure.

FIG. 4 is a diagram illustrating an example 400 of determining time domain resources for uplink cancellation taking into account timing advance, in accordance with the present disclosure.

As shown in FIG. 4, a UE 120 may determine an offset value 405 (shown as d). The offset value 405 may be used by the UE 120 to determine reference uplink resources 410 associated with ULCIs (shown as a ULCI 415). In some aspects, the UE 120 may receive an indication of the offset value 405 from a base station 110. For example, the UE 120 may receive an indication of the offset value 405 in a configuration message, such as a radio resource control (RRC) message (e.g., an RRC configuration message or an RRC reconfiguration message). Additionally, or alternatively, the UE 120 may determine the offset value 405 based at least in part on a timing advance value. In some aspects, the UE 120 may receive the timing advance value from a base station 110. In some aspects, the UE 120 may determine the offset value 405 as a value that is greater than the timing advance value (e.g., may set the offset value 405 to a value that is greater than the timing advance value). Thus, the UE 120 may determine the offset value 405 based at least in part on an indication from the base station 110.

In some aspects, the offset value 405 is indicated using a value that represents a number of symbols. In some aspects, the symbol length of each symbol, of the number of symbols, is determined by the UE 120 based at least in part on a symbol length of downlink symbols in a downlink bandwidth part (BWP) on which a ULCI 415 is received. For example, in a mixed numerology scenario, downlink symbols and uplink symbols may have different symbol lengths. In this scenario, the UE 120 may use the symbol length of downlink symbols to determine a symbol length of the uplink symbols indicated by the offset value 405 to reduce or avoid ambiguity between the UE 120 and the base station 110.

In some aspects, the offset value 405 is greater than or equal to a maximum timing advance value associated with the UE 120. This may ensure that the UE 120 is able to perform uplink cancellation after receiving the ULCI 415, regardless of a TA and/or propagation delay associated with the UE 120. In some aspects, the maximum timing advance value is based at least in part on a size of a serving cell of the UE 120 (e.g., a larger maximum TA value for a larger size cell and a smaller maximum TA for a smaller size cell). Additionally, or alternatively, the offset value 405 may be greater than or equal to a maximum timing advance value associated with a group of UEs 120, including the UE 120, to which the ULCI 415 is transmitted. For example, a base station 110 may use group-common DCI signaling to perform uplink cancellation for a group of UEs 120. In this case, using an offset value 405 that is greater than or equal to a maximum timing advance value associated with the group of UEs 120 may ensure that all UEs 120 in the group are able to perform uplink cancellation after receiving the ULCI 415, regardless of a TA and/or propagation delay associated with UEs 120 in the group.

As further shown in FIG. 4, the base station 110 may transmit, and the UE 120 may receive, a ULCI 415. In some aspects, the ULCI 415 is transmitted as or included in a DCI message having a particular DCI format, such as DCI format 2_4. The base station 110 may identify one or more time domain resources in which one or more uplink communications of the UE 120 are to be cancelled, and may transmit the ULCI 415 to cancel the one or more uplink communications.

As further shown in FIG. 4, the UE 120 may determine a set of reference uplink resources 410 based at least in part on the offset value 405 and a time domain resource in which the ULCI 415 is received. As further shown, the UE 120 may determine the set of reference uplink resources 410 based at least in part on the time domain resource in which the ULCI 415 is received, the offset value 405, and an uplink processing time 420 (e.g., a PUSCH preparation time, a PUSCH preparation time, or a PUSCH preparation procedure time) associated with the UE 120. As an example, the uplink processing time 420 is shown in FIG. 4 as $T_{proc,2}$, which may correspond to a time required for the UE 120 to detect the ULCI 415 and to cancel a subsequent uplink communication. In some aspects, an initial symbol (e.g., an earliest-occurring symbol) of the set of reference uplink resources 410 (shown as Ta symbols) is offset from a last symbol (e.g., a latest-occurring symbol) of the ULCI 415 by a number of symbols that is equal to or based at least in part on the uplink processing time 420 of the UE 120 plus the offset value 405, as shown.

As shown by reference number 425, in some aspects, the UE 120 may determine the set of reference uplink resources 410 based at least in part on the uplink processing time 420 of the UE 120, the offset value 405, and a logical time or a logical symbol index of a PDCCH communication (e.g., DCI format 2_4) that carries the ULCI 415. For example, an initial symbol of the set of reference uplink resources 410 may be offset from a logical symbol index of a last symbol of the ULCI 415 by a number of symbols that is equal to an uplink processing time 420 of the UE 120 plus the offset value 405. As a more particular example, and as shown in FIG. 4, if the uplink processing time 420 of the UE 120 is 5 symbols and the offset value 405 is 2 symbols, and if the last symbol of the ULCI 415 has a symbol index of 2, then the initial symbol of the set of reference uplink resources 410 has a symbol index of 10 (because 5+2=7 symbols occur between the end of the ULCI 415 and the start of the set of reference uplink resources 410). In this example, the propagation delay is equal to 1 symbol and the TA is equal to 2 symbols, and thus the actual time gap between the end of the ULCI 415 and the start of the set of reference uplink resources is 5 symbols, which is equal to the uplink processing time 420 and sufficient for the UE 120 to cancel uplink communication(s) in the set of reference uplink resources 410.

Based at least in part on determining the set of reference uplink resources 410, the UE 120 may cancel one or more uplink communications in the set of reference uplink resources 410 (e.g., one or more uplink communications scheduled to occur in the set of reference uplink resources 410). For example, the UE 120 may cancel a lower priority uplink communication based at least in part on a higher priority uplink communication (e.g., associated with one or more other UEs 120) being scheduled in the set of reference uplink resources 410. The uplink communication to be cancelled may include, for example, a PUSCH communication or a sounding reference signal (SRS).

Using the techniques described herein, a UE 120 may be capable of cancelling an uplink communication, that is advanced in time, because a start of the set of reference uplink resources 410 is shifted later in time by the offset value 405. In this way, interference with a high priority uplink communications (e.g., a URLLC communication) may be avoided, thereby increasing reliability and reducing latency of URLLC communications.

As indicated above, FIG. 4 is provided as an example. Other examples may differ from what is described with regard to FIG. 4.

Figure 5:
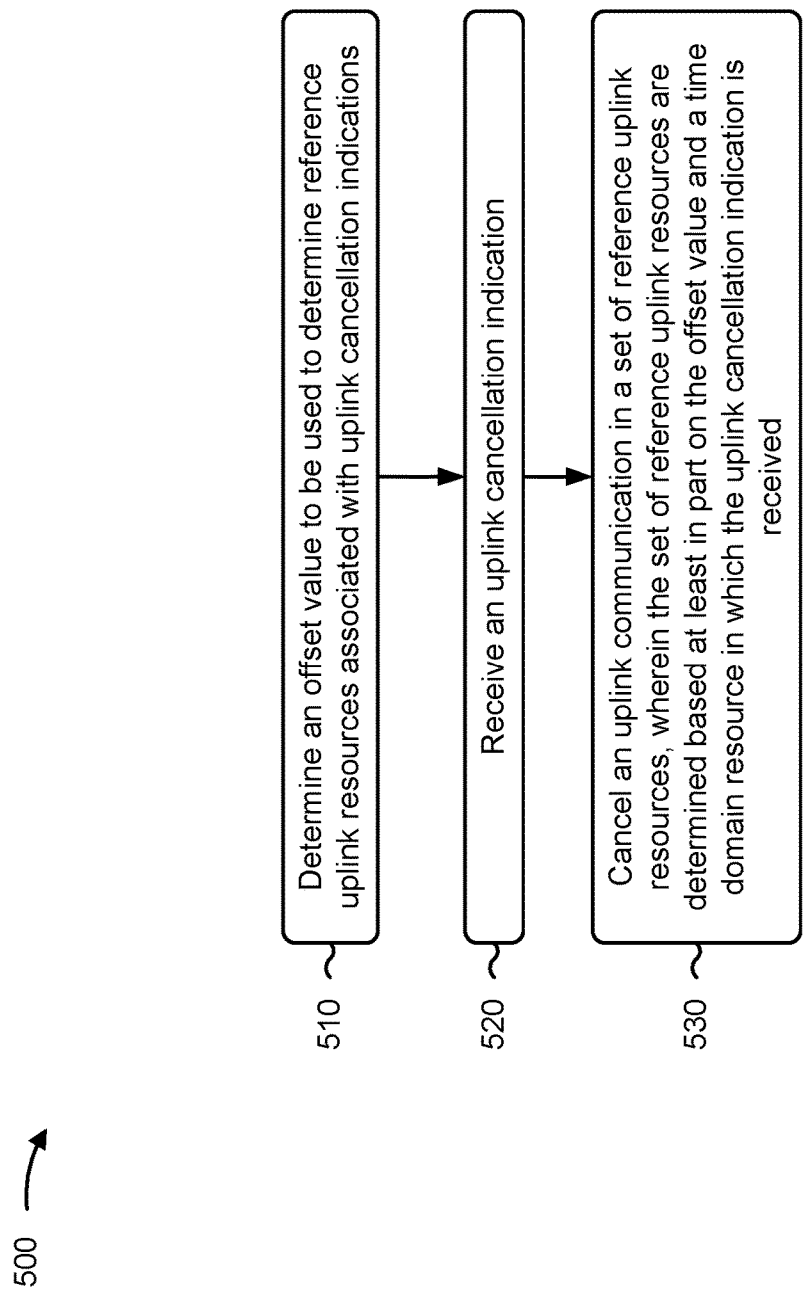
FIG. 5 is a diagram illustrating an example process performed, for example, by a user equipment, in accordance with the present disclosure.

FIG. 5 is a diagram illustrating an example process 500 performed, for example, by a UE, in accordance with the present disclosure. Example process 500 is an example where the UE (e.g., UE 120 and/or the like) performs operations associated with determining time domain resources for uplink cancellation.

As shown in FIG. 5, in some aspects, process 500 may include determining an offset value to be used to determine reference uplink resources associated with uplink cancellation indications (block 510). For example, the UE (e.g., using receive processor 258, controller/processor 280, memory 282, and/or the like) may determine an offset value to be used to determine reference uplink resources associated with uplink cancellation indications, as described above.

As further shown in FIG. 5, in some aspects, process 500 may include receiving an uplink cancellation indication (block 520). For example, the UE (e.g., using receive processor 258, controller/processor 280, memory 282, and/or the like) may receive an uplink cancellation indication, as described above.

As further shown in FIG. 5, in some aspects, process 500 may include cancelling an uplink communication in a set of reference uplink resources, wherein the set of reference uplink resources are determined based at least in part on the offset value and a time domain resource in which the uplink cancellation indication is received (block 530). For example, the UE (e.g., using transmit processor 264, controller/processor 280, memory 282, and/or the like) may cancel an uplink communication in a set of reference uplink resources, as described above. In some aspects, the set of reference uplink resources are determined based at least in part on the offset value and a time domain resource in which the uplink cancellation indication is received.

Process 500 may include additional aspects, such as any single aspect or any combination of aspects described below and/or in connection with one or more other processes described elsewhere herein.

In a first aspect, the set of reference uplink resources are determined based at least in part on an uplink processing time of the UE.

In a second aspect, alone or in combination with the first aspect, an initial symbol of the set of reference uplink resources is offset from a last symbol of the uplink cancellation indication by a number of symbols that is equal to an uplink processing time of the UE plus the offset value.

In a third aspect, alone or in combination with one or more of the first and second aspects, the uplink processing time is a physical uplink shared channel preparation procedure time corresponding to a time required for the UE to detect the uplink cancellation indication and to cancel the uplink communication.

In a fourth aspect, alone or in combination with one or more of the first through third aspects, the uplink communication includes at least one of a physical uplink shared channel communication or a sounding reference signal.

In a fifth aspect, alone or in combination with one or more of the first through fourth aspects, the uplink cancellation indication is included in a downlink control information message having format 2_4.

In a sixth aspect, alone or in combination with one or more of the first through fifth aspects, the offset value is indicated as a number of symbols.

In a seventh aspect, alone or in combination with one or more of the first through sixth aspects, a symbol length of each symbol, of the number of symbols, is determined based at least in part on a symbol length of downlink symbols in a downlink bandwidth part on which the uplink cancellation indicated is received.

In an eighth aspect, alone or in combination with one or more of the first through seventh aspects, the downlink symbols have a different symbol length than uplink symbols configured for the UE.

In a ninth aspect, alone or in combination with one or more of the first through eighth aspects, the offset value is greater than or equal to a maximum timing advance value associated with the UE.

In a tenth aspect, alone or in combination with one or more of the first through ninth aspects, the offset value is greater than or equal to a maximum timing advance value associated with a group of UEs, including the UE, to which the uplink cancellation indication is transmitted.

In an eleventh aspect, alone or in combination with one or more of the first through tenth aspects, the maximum timing advance value is based at least in part on a size of a serving cell.

In a twelfth aspect, alone or in combination with one or more of the first through eleventh aspects, the offset value is indicated in a configuration message received by the UE. For example, the UE may determine the offset value based at least in part on receiving an indication of the offset value in a configuration message. The configuration message may be a radio resource control message. In some aspects, the offset value is equal to two symbols.

In a thirteenth aspect, alone or in combination with one or more of the first through twelfth aspects, the uplink communication is cancelled based at least in part on a communication, associated with one or more other UEs, that has a higher priority than the uplink communication.

In a fourteenth aspect, alone or in combination with one or more of the first through thirteenth aspects, the set of reference uplink resources is determined based at least in part on a logical time or a logical symbol index of a physical downlink control channel communication that carries the uplink cancellation indication, an uplink processing time of the UE, and the offset value.

In a fifteenth aspect, alone or in combination with one or more of the first through fourteenth aspects, an initial symbol of the set of reference uplink resources is offset from a logical symbol index of a last symbol of the uplink cancellation indication by a number of symbols that is equal to an uplink processing time of the UE plus the offset value.

In a sixteenth aspect, alone or in combination with one or more of the first through fifteenth aspects, the offset value is determined based at least in part on a timing advance value.

In a seventeenth aspect, alone or in combination with one or more of the first through sixteenth aspects, the timing advance value is received from a base station.

In an eighteenth aspect, alone or in combination with one or more of the first through seventeenth aspects, process 500 includes determining the offset value as a value that is greater than the timing advance value.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
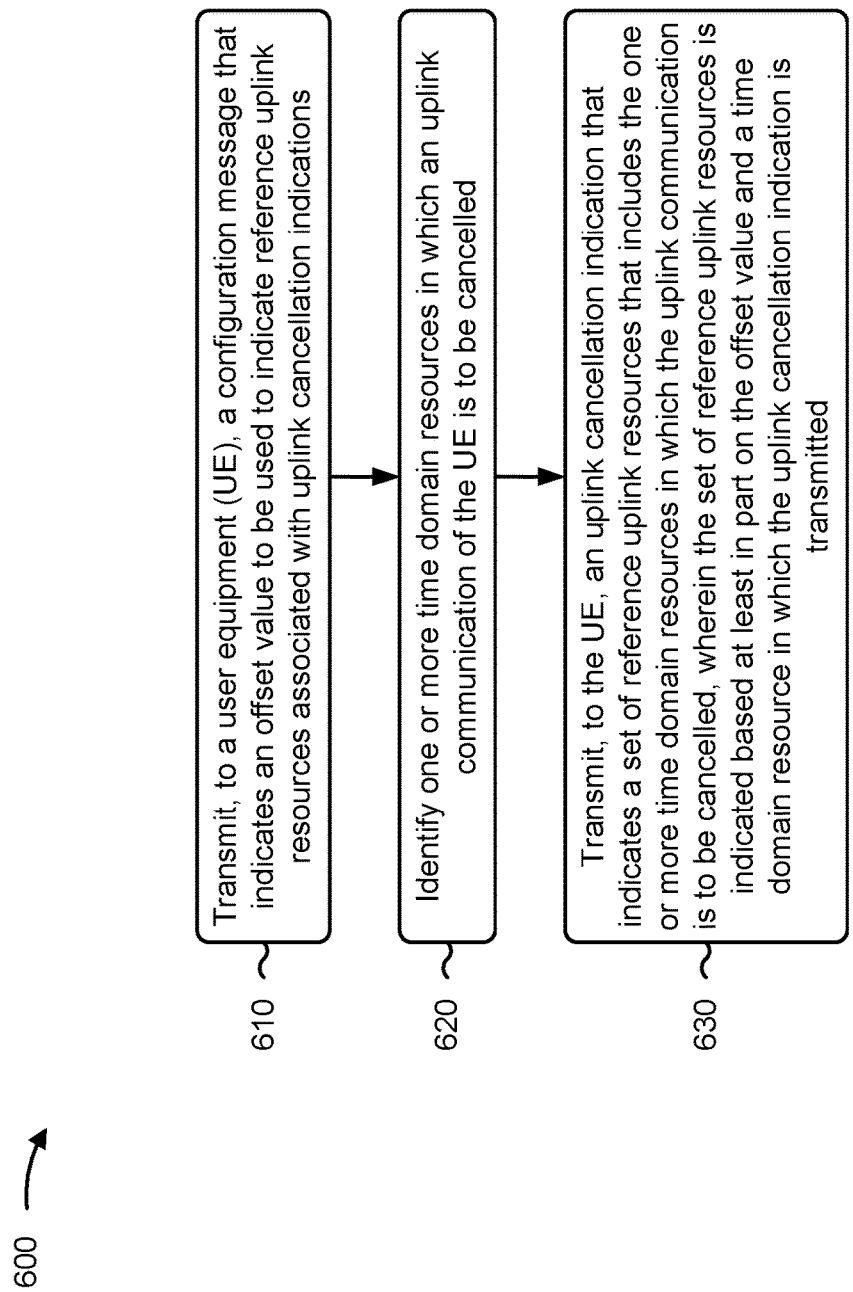
FIG. 6 is a diagram illustrating an example process performed, for example, by a base station, in accordance with the present disclosure.

FIG. 6 is a diagram illustrating an example process 600 performed, for example, by a base station, in accordance with the present disclosure. Example process 600 is an example where the base station (e.g., base station 110 and/or the like) performs operations associated with determining time domain resources for uplink cancellation.

As shown in FIG. 6, in some aspects, process 600 may include transmitting, to a UE, a configuration message that indicates an offset value to be used to indicate reference uplink resources associated with uplink cancellation indications (block 610). For example, the base station (e.g., using transmit processor 220, receive processor 238, controller/processor 240, memory 242, and/or the like) may transmit, to a UE, a configuration message that indicates an offset value to be used to indicate reference uplink resources associated with uplink cancellation indications, as described above.

As further shown in FIG. 6, in some aspects, process 600 may include identifying one or more time domain resources in which an uplink communication of the UE is to be cancelled (block 620). For example, the base station (e.g., using transmit processor 220, receive processor 238, controller/processor 240, memory 242, and/or the like) may identify one or more time domain resources in which an uplink communication of the UE is to be cancelled, as described above.

As further shown in FIG. 6, in some aspects, process 600 may include transmitting, to the UE, an uplink cancellation indication that indicates a set of reference uplink resources that includes the one or more time domain resources in which the uplink communication is to be cancelled, wherein the set of reference uplink resources is indicated based at least in part on the offset value and a time domain resource in which the uplink cancellation indication is transmitted (block 630). For example, the base station (e.g., using transmit processor 220, receive processor 238, controller/processor 240, memory 242, and/or the like) may transmit, to the UE, an uplink cancellation indication that indicates a set of reference uplink resources that includes the one or more time domain resources in which the uplink communication is to be cancelled, as described above. In some aspects, the set of reference uplink resources is indicated based at least in part on the offset value and a time domain resource in which the uplink cancellation indication is transmitted.

Process 600 may include additional aspects, such as any single aspect or any combination of aspects described below and/or in connection with one or more other processes described elsewhere herein.

In a first aspect, the set of reference uplink resources are indicated based at least in part on an uplink processing time of the UE.

In a second aspect, alone or in combination with the first aspect, an initial symbol of the set of reference uplink resources is offset from a last symbol of the uplink cancellation indication by a number of symbols that is equal to an uplink processing time of the UE plus the offset value.

In a third aspect, alone or in combination with one or more of the first and second aspects, the uplink processing time is a physical uplink shared channel preparation procedure time corresponding to a time required for the UE to detect the uplink cancellation indication and to cancel the uplink communication.

In a fourth aspect, alone or in combination with one or more of the first through third aspects, the uplink communication includes at least one of a physical uplink shared channel communication or a sounding reference signal.

In a fifth aspect, alone or in combination with one or more of the first through fourth aspects, the uplink cancellation indication is included in a downlink control information message having format 2_4.

In a sixth aspect, alone or in combination with one or more of the first through fifth aspects, the offset value is indicated as a number of symbols.

In a seventh aspect, alone or in combination with one or more of the first through sixth aspects, a symbol length of each symbol, of the number of symbols, is determined based at least in part on a symbol length of downlink symbols in a downlink bandwidth part on which the uplink cancellation indicated is transmitted.

In an eighth aspect, alone or in combination with one or more of the first through seventh aspects, the downlink symbols have a different symbol length than uplink symbols configured for the UE.

In a ninth aspect, alone or in combination with one or more of the first through eighth aspects, the offset value is greater than or equal to a maximum timing advance value associated with the UE.

In a tenth aspect, alone or in combination with one or more of the first through ninth aspects, the offset value is greater than or equal to a maximum timing advance value associated with a group of UEs, including the UE, to which the uplink cancellation indication is transmitted.

In an eleventh aspect, alone or in combination with one or more of the first through tenth aspects, the maximum timing advance value is based at least in part on a size of a serving cell.

In a twelfth aspect, alone or in combination with one or more of the first through eleventh aspects, the configuration message is a radio resource control message.

In a thirteenth aspect, alone or in combination with one or more of the first through twelfth aspects, the uplink communication is cancelled based at least in part on a communication, associated with one or more other UEs, that has a higher priority than the uplink communication.

In a fourteenth aspect, alone or in combination with one or more of the first through thirteenth aspects, the set of reference uplink resources is indicated based at least in part on a logical time or a logical symbol index of a physical downlink control channel communication that carries the uplink cancellation indication, an uplink processing time of the UE, and the offset value.

In a fifteenth aspect, alone or in combination with one or more of the first through fourteenth aspects, an initial symbol of the set of reference uplink resources is offset from a logical symbol index of a last symbol of the uplink cancellation indication by a number of symbols that is equal to an uplink processing time of the UE plus the offset value.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
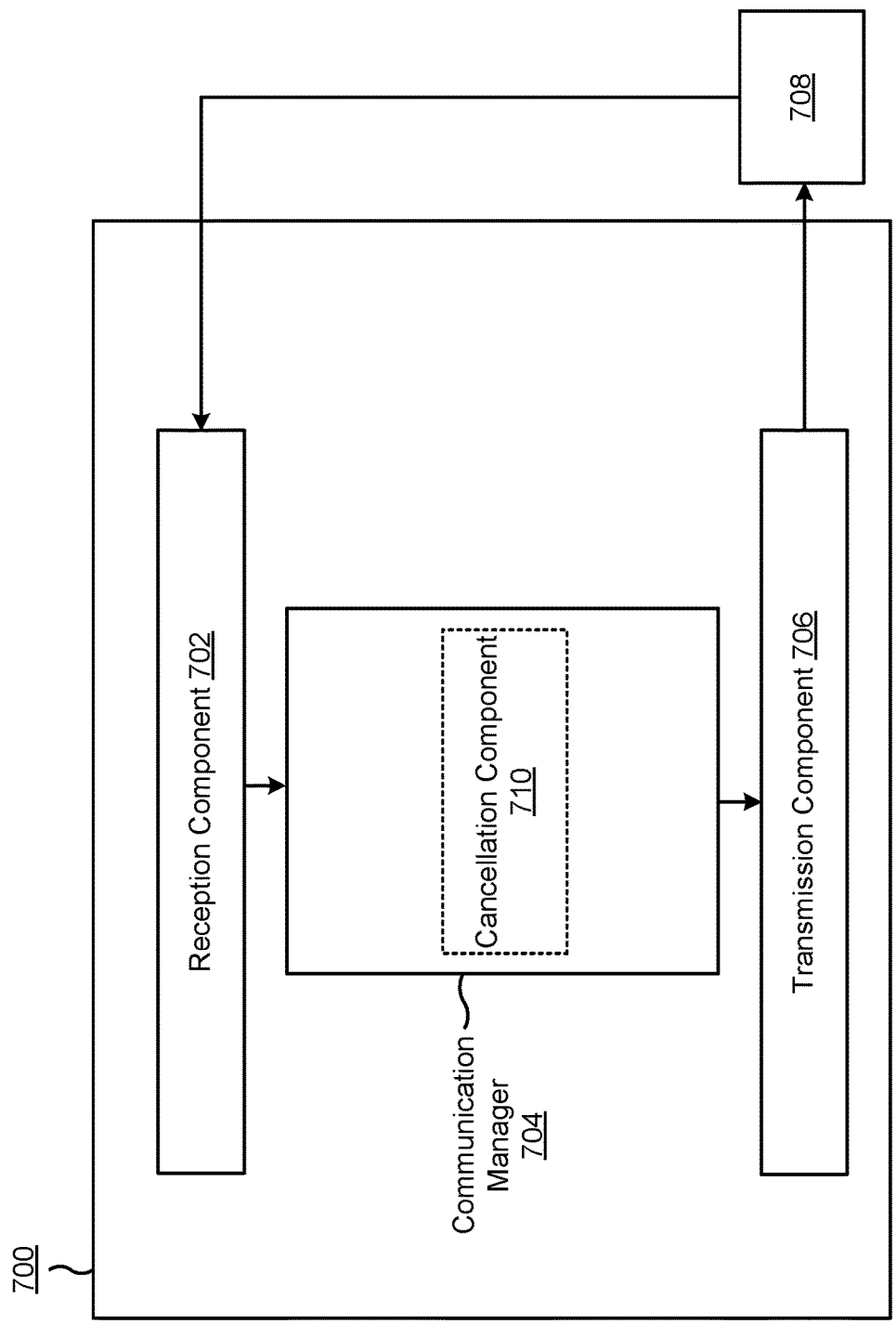
FIG. 7 is a block diagram of an example apparatus for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702, a communication manager 704, and a transmission component 706, which may be in communication with one another (for example, via one or more buses). As shown, the apparatus 700 may communicate with another apparatus 708 (such as a UE, a base station, or another wireless communication device) using the reception component 702 and the transmission component 706.

In some aspects, the apparatus 700 may be configured to perform one or more operations described herein. Additionally or alternatively, the apparatus 700 may be configured to perform one or more processes described herein, such as process 500 of FIG. 5. In some aspects, the apparatus 700 may include one or more components of the UE described above in connection with FIG. 2.

The reception component 702 may receive communications, such as reference signals, control information, data communications, or a combination thereof, from the apparatus 708. The reception component 702 may provide received communications to one or more other components of the apparatus 700, such as the communication manager 704. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 702 may include one or more antennas, a demodulator, a MIMO detector, a receive processor, a controller/processor, a memory, or a combination thereof, of the UE described above in connection with FIG. 2.

The transmission component 706 may transmit communications, such as reference signals, control information, data communications, or a combination thereof, to the apparatus 708. In some aspects, the communication manager 704 may generate communications and may transmit the generated communications to the transmission component 706 for transmission to the apparatus 708. In some aspects, the transmission component 706 may perform signal processing on the generated communications (such as filtering, amplification, modulation, digital-to-analog conversion, multiplexing, interleaving, mapping, or encoding, among other examples), and may transmit the processed signals to the apparatus 708. In some aspects, the transmission component 706 may include one or more antennas, a modulator, a transmit MIMO processor, a transmit processor, a controller/processor, a memory, or a combination thereof, of the UE described above in connection with FIG. 2. In some aspects, the transmission component 706 may be collocated with the reception component 702 in a transceiver.

The communication manager 704 may determine an offset value to be used to determine reference uplink resources associated with uplink cancellation indications. The communication manager 704 may receive or may cause the reception component 702 to receive an uplink cancellation indication. The communication manager 704 may cancel an uplink communication in a set of reference uplink resources, wherein the set of reference uplink resources are determined based at least in part on the offset value and a time domain resource in which the uplink cancellation indication is received. In some aspects, the communication manager 704 may include a controller/processor, a memory, or a combination thereof, of the UE described above in connection with FIG. 2.

In some aspects, the communication manager 704 may include a set of components, such as a cancellation component 710. Alternatively, the set of components may be separate and distinct from the communication manager 704. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The cancellation component 710 may cancel an uplink communication in a set of reference uplink resources, wherein the set of reference uplink resources are determined based at least in part on the offset value and a time domain resource in which the uplink cancellation indication is received.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

Figure 8:
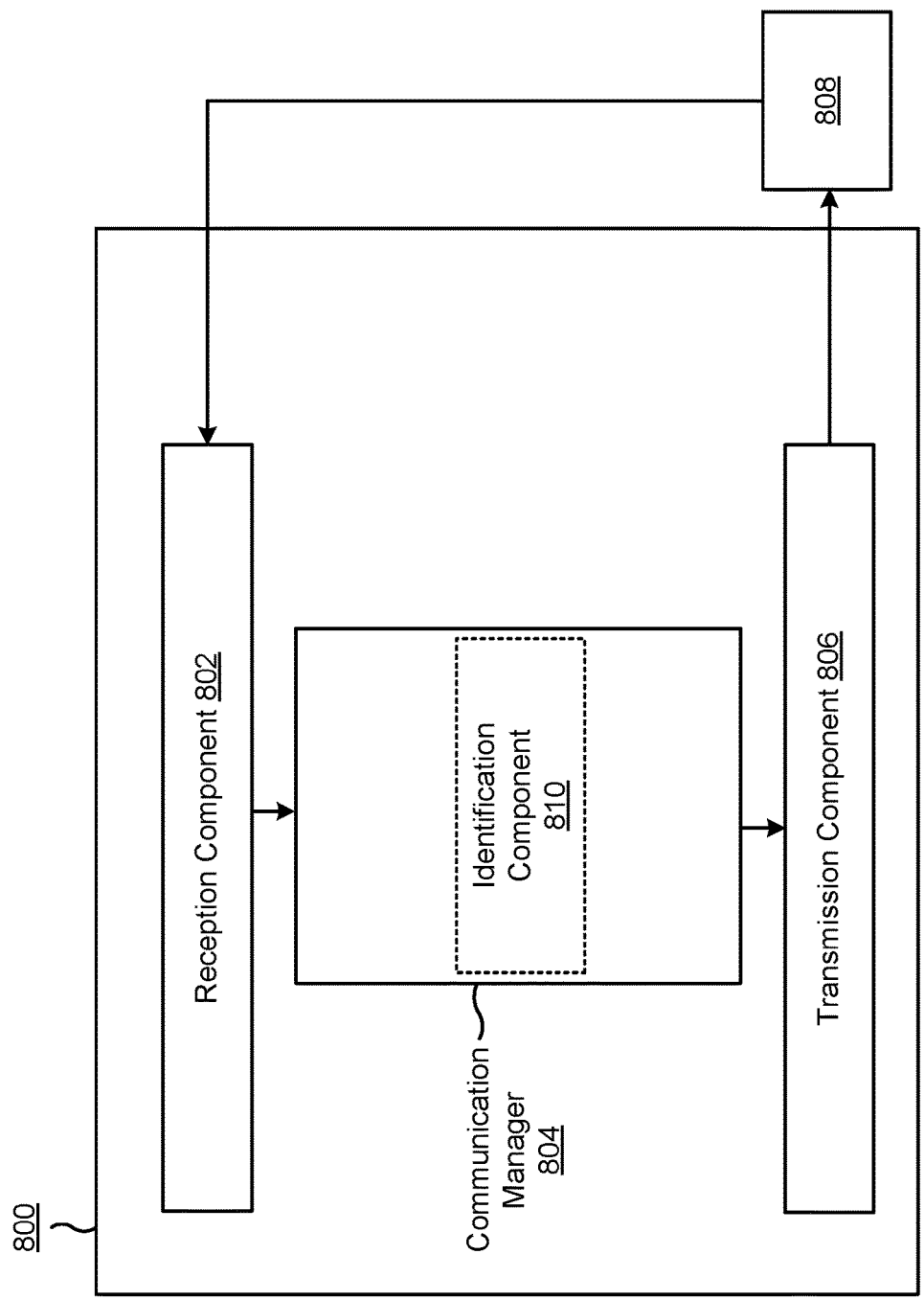
FIG. 8 is a block diagram of another example apparatus for wireless communication, in accordance with the present disclosure.

FIG. 8 is a block diagram of an example apparatus 800 for wireless communication. The apparatus 800 may be a base station, or a base station may include the apparatus 800. In some aspects, the apparatus 800 includes a reception component 802, a communication manager 804, and a transmission component 806, which may be in communication with one another (for example, via one or more buses). As shown, the apparatus 800 may communicate with another apparatus 808 (such as a UE, a base station, or another wireless communication device) using the reception component 802 and the transmission component 806.

In some aspects, the apparatus 800 may be configured to perform one or more operations described herein. Additionally or alternatively, the apparatus 800 may be configured to perform one or more processes described herein, such as process 600 of FIG. 6. In some aspects, the apparatus 800 may include one or more components of the base station described above in connection with FIG. 2.

The reception component 802 may receive communications, such as reference signals, control information, data communications, or a combination thereof, from the apparatus 808. The reception component 802 may provide received communications to one or more other components of the apparatus 800, such as the communication manager

804. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a demodulator, a MIMO detector, a receive processor, a controller/processor, a memory, or a combination thereof, of the base station described above in connection with FIG. 2.

The transmission component 806 may transmit communications, such as reference signals, control information, data communications, or a combination thereof, to the apparatus 808. In some aspects, the communication manager 804 may generate communications and may transmit the generated communications to the transmission component 806 for transmission to the apparatus 808. In some aspects, the transmission component 806 may perform signal processing on the generated communications (such as filtering, amplification, modulation, digital-to-analog conversion, multiplexing, interleaving, mapping, or encoding, among other examples), and may transmit the processed signals to the apparatus 808. In some aspects, the transmission component 806 may include one or more antennas, a modulator, a transmit MIMO processor, a transmit processor, a controller/processor, a memory, or a combination thereof, of the base station described above in connection with FIG. 2. In some aspects, the transmission component 806 may be collocated with the reception component 802 in a transceiver.

The communication manager 804 may transmit or may cause the transmission component 806 to transmit a configuration message that indicates an offset value to be used to indicate reference uplink resources associated with uplink cancellation indications. The communication manager 804 may identify one or more time domain resources in which an uplink communication of the UE is to be cancelled. The communication manager 804 transmit or may cause the transmission component 806 to transmit an uplink cancellation indication that indicates a set of reference uplink resources that includes the one or more time domain resources in which the uplink communication is to be cancelled, wherein the set of reference uplink resources is indicated based at least in part on the offset value and a time domain resource in which the uplink cancellation indication is transmitted. In some aspects, the communication manager 804 may include a controller/processor, a memory, a scheduler, a communication unit, or a combination thereof, of the base station described above in connection with FIG. 2.

In some aspects, the communication manager 804 may include a set of components, such as an identification component 810. Alternatively, the set of components may be separate and distinct from the communication manager 804. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The identification component 810 may identify one or more time domain resources in which an uplink communication of the UE is to be cancelled.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: determining an offset value to be used to determine reference uplink resources associated with uplink cancellation indications; receiving an uplink cancellation indication; and cancelling an uplink communication in a set of reference uplink resources, wherein the set of reference uplink resources are determined based at least in part on the offset value and a time domain resource in which the uplink cancellation indication is received.

Aspect 2: The method of Aspect 1, wherein the set of reference uplink resources are determined based at least in part on an uplink processing time of the UE.

Aspect 3: The method of Aspect 2, wherein the uplink processing time is a physical uplink shared channel preparation procedure time corresponding to a time required for the UE to detect the uplink cancellation indication and to cancel the uplink communication.

Aspect 4: The method of any of Aspects 1-3, wherein an initial symbol of the set of reference uplink resources is offset from a last symbol of the uplink cancellation indication by a number of symbols that is equal to an uplink processing time of the UE plus the offset value.

Aspect 5: The method of any of Aspects 1-4, wherein the uplink communication includes at least one of a physical uplink shared channel communication or a sounding reference signal.

Aspect 6: The method of any of Aspects 1-5, wherein the uplink cancellation indication is included in a downlink control information message having format 2_4.

Aspect 7: The method of any of Aspects 1-6, wherein the offset value is indicated in a configuration message received by the UE.

Aspect 8: The method of any of Aspects 1-7, wherein the offset value is indicated as a number of symbols.

Aspect 9: The method of Aspect 8, wherein a symbol length of each symbol, of the number of symbols, is determined based at least in part on a symbol length of downlink symbols in a downlink bandwidth part on which the uplink cancellation indicated is received.

Aspect 10: The method of Aspect 9, wherein the downlink symbols have a different symbol length than uplink symbols configured for the UE.

Aspect 11: The method of any of Aspects 1-10, wherein the offset value is greater than or equal a maximum timing advance value associated with the UE.

Aspect 12: The method of Aspect 11, wherein the maximum timing advance value is based at least in part on a size of a serving cell.

Aspect 13: The method of any of Aspects 1-12, wherein the offset value is greater than or equal to a maximum timing advance value associated with a group of UEs, including the UE, to which the uplink cancellation indication is transmitted.

Aspect 14: The method of any of Aspects 1-13, wherein the uplink communication is cancelled based at least in part on a communication, associated with one or more other UEs, that has a higher priority than the uplink communication.

Aspect 15: The method of any of Aspects 1-14, wherein the set of reference uplink resources is determined based at least in part on a logical time or a logical symbol index of a physical downlink control channel communication that carries the uplink cancellation indication, an uplink processing time of the UE, and the offset value.

Aspect 16: The method of Aspect 15, wherein an initial symbol of the set of reference uplink resources is offset from a logical symbol index of a last symbol of the uplink cancellation indication by a number of symbols that is equal to an uplink processing time of the UE plus the offset value.

Aspect 17: The method of any of Aspects 1-16, wherein the offset value is determined based at least in part on a timing advance value.

Aspect 18: The method of Aspect 17, wherein the timing advance value is received from a base station.

Aspect 19: The method of any of Aspects 17-18, further comprising determining the offset value as a value that is greater than the timing advance value.

Aspect 20: A method of wireless communication performed by a base station, comprising: transmitting, to a user equipment (UE), a configuration message that indicates an offset value to be used to indicate reference uplink resources associated with uplink cancellation indications; identifying one or more time domain resources in which an uplink communication of the UE is to be cancelled; and transmitting, to the UE, an uplink cancellation indication that indicates a set of reference uplink resources that includes the one or more time domain resources in which the uplink communication is to be cancelled, wherein the set of reference uplink resources is indicated based at least in part on the offset value and a time domain resource in which the uplink cancellation indication is transmitted.

Aspect 21: The method of Aspect 20, wherein the set of reference uplink resources are indicated based at least in part on an uplink processing time of the UE.

Aspect 22: The method of Aspect 21, wherein the uplink processing time is a physical uplink shared channel preparation procedure time corresponding to a time required for the UE to detect the uplink cancellation indication and to cancel the uplink communication.

Aspect 23: The method of any of Aspects 20-22, wherein an initial symbol of the set of reference uplink resources is offset from a last symbol of the uplink cancellation indication by a number of symbols that is equal to an uplink processing time of the UE plus the offset value.

Aspect 24: The method of any of Aspects 20-23, wherein the uplink communication includes at least one of a physical uplink shared channel communication or a sounding reference signal.

Aspect 25: The method of any of Aspects 20-24, wherein the uplink cancellation indication is included in a downlink control information message having format 2_4.

Aspect 26: The method of Aspect 20 any of Aspects 20-25, wherein the offset value is indicated as a number of symbols.

Aspect 27: The method of Aspect 26, wherein a symbol length of each symbol, of the number of symbols, is determined based at least in part on a symbol length of downlink symbols in a downlink bandwidth part on which the uplink cancellation indicated is transmitted.

Aspect 28: The method of Aspect 27, wherein the downlink symbols have a different symbol length than uplink symbols configured for the UE.

Aspect 29: The method of any of Aspects 20-28, wherein the offset value is greater than or equal to a maximum timing advance value associated with the UE.

Aspect 30: The method of Aspect 29, wherein the maximum timing advance value is based at least in part on a size of a serving cell.

Aspect 31: The method of any of Aspects 20-30, wherein the offset value is greater than or equal a maximum timing advance value associated with a group of UEs, including the UE, to which the uplink cancellation indication is transmitted.

Aspect 32: The method of any of Aspects 20-31, wherein the configuration message is a radio resource control message.

Aspect 33: The method of any of Aspects 20-32, wherein the uplink communication is cancelled based at least in part on a communication associated with one or more other UEs that has a higher priority than the uplink communication.

Aspect 34: The method of any of Aspects 20-33, wherein the set of reference uplink resources is indicated based at least in part on a logical time or a logical symbol index of a physical downlink control channel communication that carries the uplink cancellation indication, an uplink processing time of the UE, and the offset value.

Aspect 35: The method of Aspect 34, wherein an initial symbol of the set of reference uplink resources is offset from a logical symbol index of a last symbol of the uplink cancellation indication by a number of symbols that is equal to an uplink processing time of the UE plus the offset value.

Aspect 36: An apparatus for wireless communication at a device, comprising a processor; memory coupled with the processor; and instructions stored in the memory and executable by the processor to cause the apparatus to perform the method of one or more Aspects of Aspects 1-19.

Aspect 37: A device for wireless communication, comprising a memory and one or more processors coupled to the memory, the memory and the one or more processors configured to perform the method of one or more Aspects of Aspects 1-19.

Aspect 38: An apparatus for wireless communication, comprising at least one means for performing the method of one or more Aspects of Aspects 1-19.

Aspect 39: A non-transitory computer-readable medium storing code for wireless communication, the code comprising instructions executable by a processor to perform the method of one or more Aspects of Aspects 1-19.

Aspect 40: A non-transitory computer-readable medium storing a set of instructions for wireless communication, the set of instructions comprising one or more instructions that, when executed by one or more processors of a device, cause the device to perform the method of one or more Aspects of Aspects 1-19.

Aspect 41: An apparatus for wireless communication at a device, comprising a processor; memory coupled with the processor; and instructions stored in the memory and executable by the processor to cause the apparatus to perform the method of one or more Aspects of Aspects 20-35.

Aspect 42: A device for wireless communication, comprising a memory and one or more processors coupled to the memory, the memory and the one or more processors configured to perform the method of one or more Aspects of Aspects 20-35.

Aspect 43: An apparatus for wireless communication, comprising at least one means for performing the method of one or more Aspects of Aspects 20-35.

Aspect 44: A non-transitory computer-readable medium storing code for wireless communication, the code comprising instructions executable by a processor to perform the method of one or more Aspects of Aspects 20-35.

Aspect 45: A non-transitory computer-readable medium storing a set of instructions for wireless communication, the set of instructions comprising one or more instructions that, when executed by one or more processors of a device, cause the device to perform the method of one or more Aspects of Aspects 20-35.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining an offset value to be used to determine reference uplink resources associated with uplink cancellation indications;
   receiving an uplink cancellation indication; and
   cancelling an uplink communication in a set of reference uplink resources, wherein the set of reference uplink resources are determined based at least in part on the offset value and a time domain resource in which the uplink cancellation indication is received, wherein an initial symbol of the set of reference uplink resources is offset from a last symbol of the uplink cancellation indication by a number of symbols that is equal to an uplink processing time of the UE plus the offset value.

2. The method of claim 1, wherein the uplink processing time is a physical uplink shared channel preparation procedure time corresponding to a time required for the UE to detect the uplink cancellation indication and to cancel the uplink communication.

3. The method of claim 1, wherein the uplink communication includes at least one of a physical uplink shared channel communication or a sounding reference signal.

4. The method of claim 1, wherein the uplink cancellation indication is included in a downlink control information message having format 2_4.

5. The method of claim 1, wherein the offset value is indicated in a configuration message received by the UE.

6. The method of claim 5, wherein the offset value is equal to two symbols.

7. The method of claim 1, wherein the offset value is indicated as a number of symbols.

8. The method of claim 7, wherein a symbol length of each symbol, of the number of symbols, is determined based at least in part on a symbol length of downlink symbols in a downlink bandwidth part on which the uplink cancellation indication is received.

9. The method of claim 1, wherein the offset value is greater than or equal a maximum timing advance value associated with the UE.

10. The method of claim 9, wherein the maximum timing advance value is based at least in part on a size of a serving cell.

11. The method of claim 1, wherein the offset value is greater than or equal to a maximum timing advance value associated with a group of UEs, including the UE, to which the uplink cancellation indication is transmitted.

12. The method of claim 1, wherein the set of reference uplink resources is determined based at least in part on the uplink processing time of the UE, the offset value, and a logical time or a logical symbol index of a physical downlink control channel communication that carries the uplink cancellation indication.

13. The method of claim 12, wherein an initial symbol of the set of reference uplink resources is offset from a logical symbol index of a last symbol of the uplink cancellation indication by a number of symbols that is equal to the uplink processing time of the UE plus the offset value.

14. The method of claim 1, wherein the offset value is determined based at least in part on a timing advance value.

15. A user equipment (UE) for wireless communication, comprising:
a memory; and
one or more processors coupled to the memory, the one or more processors configured to:
determine an offset value to be used to determine reference uplink resources associated with uplink cancellation indications;
receive an uplink cancellation indication; and
cancel an uplink communication in a set of reference uplink resources, wherein the set of reference uplink resources are determined based at least in part on the offset value and a time domain resource in which the uplink cancellation indication is received wherein an initial symbol of the set of reference uplink resources is offset from a last symbol of the uplink cancellation indication by a number of symbols that is equal to an uplink processing time of the UE plus the offset value.

16. The UE of claim 15, wherein the uplink processing time is a physical uplink shared channel preparation procedure time corresponding to a time required for the UE to detect the uplink cancellation indication and to cancel the uplink communication.

17. The UE of claim 15, wherein the uplink communication includes at least one of a physical uplink shared channel communication or a sounding reference signal.

18. The UE of claim 15, wherein the uplink cancellation indication is included in a downlink control information message having format 2_4.

19. The UE of claim 15, wherein the offset value is indicated in a configuration message received by the UE.

20. The UE of claim 19, wherein the offset value is equal to two symbols.

21. The UE of claim 15, wherein the offset value is indicated as a number of symbols.

22. The UE of claim 21, wherein a symbol length of each symbol, of the number of symbols, is determined based at least in part on a symbol length of downlink symbols in a downlink bandwidth part on which the uplink cancellation indication is received.

23. The UE of claim 15, wherein the set of reference uplink resources is determined based at least in part on the uplink processing time of the UE, the offset value, and a logical time or a logical symbol index of a physical downlink control channel communication that carries the uplink cancellation indication.

24. The UE of claim 23, wherein an initial symbol of the set of reference uplink resources is offset from a logical symbol index of a last symbol of the uplink cancellation indication by a number of symbols that is equal to the uplink processing time of the UE plus the offset value.

25. A method of wireless communication performed by a base station, comprising:
transmitting, to a user equipment (UE), a configuration message that indicates an offset value to be used to indicate reference uplink resources associated with uplink cancellation indications;
identifying one or more time domain resources in which an uplink communication of the UE is to be cancelled; and
transmitting, to the UE, an uplink cancellation indication that indicates a set of reference uplink resources that includes the one or more time domain resources in which the uplink communication is to be cancelled, wherein the set of reference uplink resources is indicated based at least in part on the offset value and a time domain resource in which the uplink cancellation indication is transmitted, wherein an initial symbol of the set of reference uplink resources is offset from a last symbol of the uplink cancellation indication by a number of symbols that is equal to an uplink processing time of the UE plus the offset value.

26. The method of claim 25, wherein the uplink processing time is a physical uplink shared channel preparation procedure time corresponding to a time required for the UE to detect the uplink cancellation indication and to cancel the uplink communication.

27. The method of claim 25, wherein the uplink cancellation indication is included in a downlink control information message having format 2_4.

28. A base station for wireless communication, comprising:
a memory; and
one or more processors coupled to the memory, the one or more processors configured to:
transmit, to a user equipment (UE), a configuration message that indicates an offset value to be used to indicate reference uplink resources associated with uplink cancellation indications;
identify one or more time domain resources in which an uplink communication of the UE is to be cancelled; and
transmit, to the UE, an uplink cancellation indication that indicates a set of reference uplink resources that includes the one or more time domain resources in which the uplink communication is to be cancelled, wherein the set of reference uplink resources is indicated based at least in part on the offset value and a time domain resource in which the uplink cancellation indication is transmitted, wherein an initial symbol of the set of reference uplink resources is offset from a last symbol of the uplink cancellation indication by a number of symbols that is equal to an uplink processing time of the UE plus the offset value.

29. The base station of claim 28, wherein the uplink processing time is a physical uplink shared channel preparation procedure time corresponding to a time required for the UE to detect the uplink cancellation indication and to cancel the uplink communication.

30. The base station of claim 28, wherein the uplink cancellation indication is included in a downlink control information message having format 2_4.

* * * * *